United States Patent Office

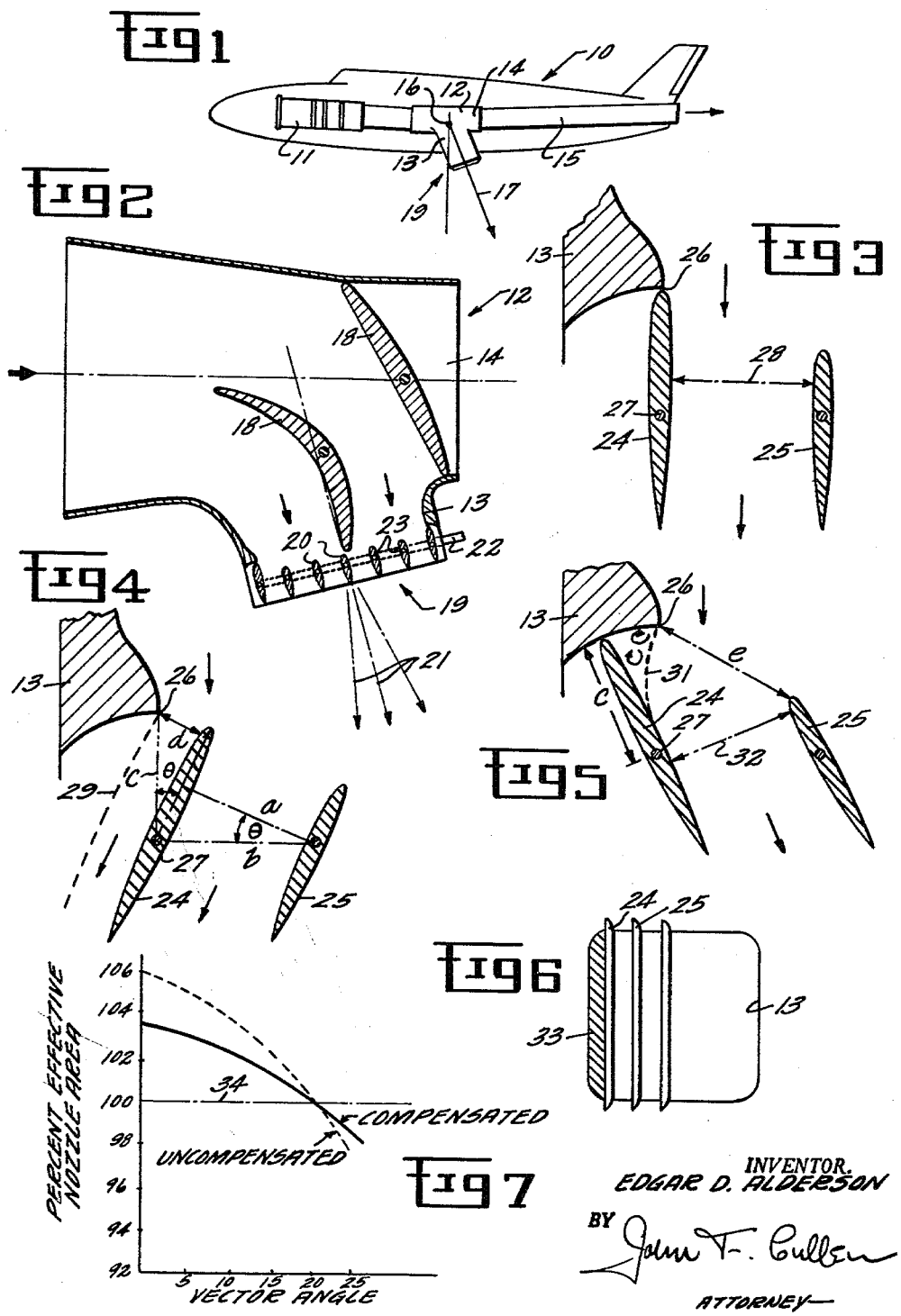

3,174,709
Patented Mar. 23, 1965

3,174,709
VECTORABLE THRUST MECHANISM
Edgar D. Alderson, Cincinnati, Ohio, assignor to General Electric Company, a corporation of New York
Filed Nov. 29, 1962, Ser. No. 240,928
12 Claims. (Cl. 244—23)

The present invention relates to a vectorable thrust mechanism and, more particularly, to such mechanism as might be used in an aircraft wherein the thrust may be vectored to different angles without substantial loss in area.

In vertical take-off and landing aircraft of the reaction type, a problem arises in varying the thrust angle to assist in smooth transition from vertical to horizontal flight and vice versa. This is especially true when the craft is of the type using the reaction from exhaust gases expanding through a nozzle directly for lift. Movable exit cascades involving a plurality of parallel louvers are known for vectoring the thrust. Such cascades may be used beyond the nozzle for turning the flow. However, this results in intolerable losses in turning the high velocity stream issuing from the nozzle. Better, the cascade may be used as the nozzle itself. When so used, the minimum area or throat area between adjacent louvers is the point where the velocity of the fluid reaches Mach 1. This is the point at which the flow is said to choke in the throat. To avoid turning of this high velocity fluid and consequent losses, it is preferable to turn the flow in the cascade before or upstream of the throat.

However, for a gas generator, such as a jet engine, there is a given design operating point for greatest thrust and it is desired to maintain the gas generator at this point of operation. In order to operate satisfactorily at the design point, the gas generator prefers to see a constant nozzle throat area. As an example, in a gas generator at its designed operating point and discharging through a nozzle which is choked, variation of this by any enlargement of the nozzle throat area results in a drop in pressure ratio across the gas generator and a drop in temperature and resultant lower thrust. If the nozzle throat area is reduced, the gas generator discharge temperature rises due to the pressure ratio change and this requires reduction of fuel flow to the gas generator to avoid overtemperature and resultant lower thrust. Cascades of louvers normally close down the area, through which the gas generator discharges, as they are rotated from open toward closed position. Intermediate these positions, where the thrust is vectored through an angle, it can be seen that the area is gradually reduced. This is not a condition under which the gas generator will operate most satisfactorily. It is desired to maintain the area constant or substantially constant for maximum thrust. The terms "open" and "close(d)" are used to denote the direction of louver movement but it will be understood that they need not be completely closed at any time.

The main object of the present invention is to provide a vectorable thrust mechanism which may be used with a gas generator and maintains the exit area substantially constant while vectoring the line of thrust through a large angle.

Another object is to provide such a mechanism which operates to permit the gas generator to run at a given design point.

Further, another object is to provide a vectorable thrust mechanism which, by its unique construction, gains additional area on the closing of the cascades by an amount substantially equal to that area which is lost.

Briefly stated, the invention provides a vectorable thrust mechanism including a bifurcated conduit for the movement of fluid and which has a walled outlet means for each conduit and means in the conduit, such as a diverter valve, to divert the fluid to either outlet. One of the outlets is covered by a cascade means of a series of pivoted louvers to open and close the outlet and vector the thrust. The end louvers over the outlet form a continuation of the outlet wall when in full open position and the louvers are pivoted so that as they are rotated into a closing position, one of the end louvers is moved into the outlet and the opposite end louver is moved out of the outlet to provide additional area compensation for the area lost on the closing of the louvers. Any suitable means is provided for rotating the louvers.

While the specification concludes with claims particularly pointing out and distinctly claiming the subject matter which is regarded as the invention, it is believed the invention will be better understood from the following description taken in connection with the accompanying drawing in which:

FIG. 1 is a general outline of an aircraft showing the location of the vectorable thrust mechanism of the instant invention;

FIG. 2 is an enlarged sectional view of the diverter valve structure showing the cascade in one of the outlets;

FIG. 3 is an enlarged partial sectional view of one end of the cascade in open position as shown in FIGURE 2;

FIG. 4 is a view similar to FIGURE 3 showing the cascade in a closing position with additional area exposed;

FIG. 5 is a view of the end louver shown in the other extreme position from that of FIGURE 4 and also represents the position of the end louver at the opposite end of the cascade from that seen in FIGURE 4.

FIG. 6 is a schematic view of a rectangular opening showing the area compensation added by the louvers, and FIG. 7 is a curve of comparison showing compensated versus uncompensated area in a typical application.

Referring first to FIGURE 1, there is shown an aircraft 10 of any suitable type having a gas generator 11 discharging into a bifurcated conduit 12 which has a walled outlet means 13 directed substantially downward and a rearward directed walled outlet means 14 connected to a tailpipe 15 for rearward thrust in a well known manner. As shown, it is preferable to dispose the outlet 13 at the center of gravity 16 of the aircraft so that the line of thrust 17 passes substantially through the center of gravity to minimize balancing problems on the aircraft. It will be appreciated that the walled outlet means 13 may discharge in any suitable direction but generally will be substantially downward and preferably slightly to the rear as shown.

In order to divert the fluid or gaseous products from generator 11 in a well known manner, a suitable means such as a diverter valve or valves may be provided in the conduit 12 as shown in FIGURE 2. This means may take the form of butterfly valve means 18 which, in the position shown, diverts the fluid into outlet means 13 and, when rotated, passes the fluid directly through outlet 14 all in a well known manner. Since the downward directed outlet 13 is the one about which the thrust should be vectored, it is supplied with a cascade generally indicated at 19 which, as is well known, consists of a series of louvers 20 preferably of airfoil shape with the leading edge upstream as shown. These louvers, which are designed to form nozzle throats in the cascade between adjacent louvers, are disposed in the plane of the outlet to rotate the vectored thrust into different positions as shown by the arrows 21. Any suitable means for rotating the louvers may be supplied such as linkage 22. The louvers are rotated about pivots 23 generally passing through the louvers and lying in a common plane so that all louvers are parallel and rotate together. As shown, the louvers in FIGURE 2 are in the maximum area position and it can be seen that any rotation from the position shown reduces the area of the discharge outlet.

Since the reduction in area of the discharge outlet results in a change in exhaust area that is deleterious to engine operation, the present invention is directed to increasing or compensating this loss in area so the engine sees a constant area discharge.

Referring next to FIGURE 3, there is shown an enlarged section of the left corner of the cascade of FIGURE 2. This consists of an end louver 24 with its adjacent pivoted louver 25 shown in the maximum throat area position. Part of wall 13 is shown. For purposes that will be apparent, end louver 24 is disposed to form a continuation of wall 13 in the full open position as shown. This is obtained by the particular structure shown in FIGURE 3 wherein wall 13 has a sharp edge 26 for a purpose to be explained and louver 24 is pivoted at 27 to align itself with the edge 26 so that its leading edge is at a tangent to the surface of the wall 13 at 26 as shown in FIGURE 3. While both louvers are shown as rotatable about pivots within the louver back from the leading edge, it is essential that the end louvers be pivoted by pivot 27 back from the leading edge a distance greater than the leading edge radius of curvature as shown to prevent binding. It is also essential that the distance $c$ in FIG. 5 be greater than the distance from the pivot of louver 25 to its leading edge as will be apparent as the description proceeds.

It can be seen that rotation of the louvers reduces the throat area or choke area 28 by an amount that is a function of the cosine of the angle of rotation.

Referring to FIGURE 4, the rotation of the louvers into the new fluid intercepting position may be seen. In this position, it can be seen that the new throat area represented by $a$ is susbtantially equal to $b$ times the cosine of theta. By locating the pivot 27 of the end louver back from the leading edge a distance greater than the leading edge radius, it will be seen that the leading edge smoothly moves out of contact with sharp edge 26 and into the outlet 13 and the fluid flow and opens up an area represented by $d$ between the louver and wall 13 which is substantially equal to $c$ times the sine of theta. It will be apparent that moving the pivot 27 to vary the distance $c$ any desired new additional area $d$ may be obtained. Theoretically, it would be so arranged that the loss in areas from $b$ to $a$ would be compensated by the increase in area at $d$. Furthermore, it is to be noted that the sharp edge 26 broken away from the wall provides for a breakaway of the fluid flow to follow flow line 29 resulting in the area between the end louver and the flow line 29 acting as a nozzle from which additional thrust may be obtained. In order to vary the distance $c$, it can be seen that it will be preferable that the chord of the end louver 24 be longer than that of adjacent louvers 25.

Referring next to FIGURE 5, there is shown the position of louver 24 when it is moved to the other extreme or non-intercepting position from that shown in FIGURE 4. In this position, the thrust is vectored through a different angle. Since the louvers all pivot together, FIGURE 5 also represents what is happening at the other end louver of the cascade whose one end is shown in the adding position in FIGURE 4. Concurrently then, as seen in FIGURE 5, louver 24 is moved back in close sealing engagement under wall 13 out of the outlet and fluid flow as shown and away from sharp edge 26 resulting in a clean breakaway of flow line 31 as shown. It can be seen that a small amount of eddying takes place because of the position of the louver under the wall and this results in a slight pressure loss which is the penalty for the increased area obtainable at the other end louver as described in connection with FIGURE 4. This pressure loss is negligible. Thus, area is added at on end as shown in FIGURE 4 to compensate for the reduction in area between adjacent louvers while there is no more loss of area at the opposite end as represented in FIGURE 5 over that which would be lost merely by the vectoring of the louvers. This result is obtained by keeping $e$ larger than 32 at all times and this is done by controlling $c$. Thus, it is possible to compensate the area to add substantially that which is lost by closing down the louvers. The only requirement on the end louver as shown in FIGURE 5 is that the pivot of louver 24 be so positioned as previously described that in the closed position the choke flow through the throat 32 occurs at that position rather than at $e$ between the sharp edge 26 and the end of louver 25. This can be adjusted by suitably selecting the distance $c$ to insure that throat 32 is always smaller than the distance $e$ between edge 26 and the leading edge of louver 25 so that the choking always occurs at 32. Summarizing then, the distance $c$ or the distance from the pivot of the end louver 24 to its leading edge must be greater than the same distance on louver 25 from its pivot to its leading edge. Thus, chord distances may vary so long as these pivot-to-leading-edge-distances are as stated.

It will be apparent that the vectorable thrust mechanism of the instant invention works best with a rectangular outlet opening 13 as shown in FIGURE 6. It should also be apparent that a rectangular outlet is not an essential limitation but it does provide for more area addition at 33 by rotation of louver 24. It will be apparent that area 33 is $d$ in FIGURE 4 times the louver length. In such an application, the louvers will be arranged parallel to one side of the outlet 13.

Referring next to FIGURE 7, there is shown a plot of the effective nozzle area versus the vector angle in both the compensated and uncompensated structure in an actual design. As discussed above, the compensation may be varied (by varying $c$ in FIGURE 4) so more compensation may be obtained than shown in FIGURE 7. The ideal position is a straight line 34 through the 100% effective area. With the instant invention it will be apparent that the ideal line 34 is approached much more closely by the compensated arrangement of the invention shown by the solid line for an actual design over the uncompensated dotted line position.

Summarizing, rotation of the louvers from the FIG. 3 position to any vectored thrust position results in an area loss from $b$ to $a$ between each louver as in FIG. 4. This small increment of loss occurs between each of the louvers across the cascade including the end louver rotated under the wall as in FIG. 5. With the inverted structure as described there is a benefit in that the increment of loss at the end louver in FIG. 5 is no greater than any other of the increments by reason of the breakaway at 26 and by reason of the pivoting and maintaining $e$ larger than 32. The total area loss then is the sum of all these increments across the cascade including the end louver when positioned as in FIG. 5. However, with the pivoting arrangement of the end louvers to obtain the FIG. 5 benefit, the same structure at the other end in FIG. 4 results in an increase or addition of area represented by $d$. Thus, there is a net area increase as seen in FIG. 7 and this is the result desired. Further, the control of the $c$ distance is beneficial at both ends of the cascade. Thus, if $c$ is increased, then $d$ is increased in FIG. 4 (and so is $e$ in FIG. 5) and the spacing at the zero vector angle in FIG. 7 between 104 and 106 on the ordinate tends to increase since it represents the compensation. In other words, in FIG. 7 the dotted line stays fixed and the left end of the solid line tends to move down toward line 34 when $d$ is increased. This is the result desired for area compensation.

While the invention has been described in connection with an aircraft application, the same area addition or compensation can be used wherever nozzles are applicable such as a turbine nozzle or the like but its use is primarily for vectored thrust in the field described of vertical take-off aircraft.

While there has hereinbefore been described a preferred form of the invention, obviously modifications and variations are possible in the light of the above teachings. It is therefore to be understood that within the scope of the appended claims, the invention may be practiced otherwise than as specifically described.

What is claimed is:

1. A vectorable thrust mechanism comprising, a bifurcated conduit for the movement of fluid therethrough and having a walled outlet means for each conduit, means in the conduit for diverting fluid to either outlet, cascade means covering at least one outlet having a series of pivoted louvers to open and close the outlet and vector the thrust, the end louvers over said outlet forming a continuation of said wall in full open position and each end louver being pivoted within itself a distance back from its leading edge greater than the same distance in adjacent louvers so that upon rotation of the louvers toward closing position the leading edge of one end louver is moved into the outlet to intercept fluid and the leading edge of the opposite end louver is moved out of the outlet under said wall to provide additional outlet area as compensation for the closing of the louvers, and means for rotating said louvers.

2. Apparatus as described in claim 1 wherein the wall means defining the outlet is provided with a sharp edge breaking away from the flow and, the end louvers pivot to align with said edge in open position to form said continuation of said wall.

3. Apparatus as described in claim 1 wherein the louvers are airfoil shaped with the leading edge upstream and, the end louvers are pivoted about an axis back from said leading edge a distance greater than the radius of curvature of the leading edge.

4. Apparatus as described in claim 3 wherein the end louvers have longer chords then the adjacent louvers.

5. Apparatus as described in claim 3 wherein the end louver and wall form a nozzle therebetween when said louver is rotated into the outlet.

6. A vectorable thrust mechanism for a jet aircraft comprising, a member such as a fuselage, a duct through said member having a rearward outlet for forward thrust and walled outlet means directed substantially downward, valve means in said duct for diverting exhaust gases through either outlet, cascade means over said walled outlet and having a series of parallel pivoted louvers to open and close said outlet and vector the thrust therethrough, the end louvers forming a continuation of said wall in full open position and each end louver being pivoted a distance back from its leading edge greater than the same distance in adjacent louvers so that upon rotation of the louvers into closing position the leading edge of one end louver is rotated into the outlet to intercept fluid whereby additional exhaust area is provided between said outlet wall and end louver to compensate for area reduction between the remaining louvers, and means for rotating said louvers.

7. Apparatus as described in claim 6 wherein the walled outlet is disposed so the line of thrust therethrough passes substantially through the center of gravity of the aircraft.

8. Apparatus as described in claim 6 wherein the walled outlet is rectangular and the louvers are parallel to one side.

9. Apparatus as described in claim 6 wherein the louvers are airfoil shaped with the leading edge upstream and, the end louvers are pivoted about an axis back from said leading edge a distance greater than the radius of curvature of the leading edge.

10. Apparatus as described in claim 9 wherein the wall means defining the outlet is provided with a sharp edge breaking away from the flow and, the end louvers pivot to align their leading edges with said sharp edge to form said wall continuation when said louvers are in open position.

11. Apparatus as described in claim 10 wherein the end louvers have longer chords than the adjacent louvers.

12. Apparatus as described in claim 10 wherein the end louver and wall form a nozzle therebetween when said louver is rotated into the outlet.

References Cited in the file of this patent

UNITED STATES PATENTS

| | | |
|---|---|---|
| 2,879,014 | Smith et al. | Mar. 24, 1959 |
| 2,929,580 | Giolkosz | Mar. 22, 1960 |
| 2,947,499 | Douglas | Aug. 2, 1960 |
| 3,002,709 | Cochran | Oct. 3, 1961 |
| 3,017,139 | Binder | Jan. 16, 1962 |
| 3,054,578 | Brocard | Sept. 18, 1962 |
| 3,081,597 | Kosin et al. | Mar. 19, 1963 |

FOREIGN PATENTS

| | | |
|---|---|---|
| 530,577 | Canada | Sept. 18, 1956 |